May 23, 1950 H. W. BODENDIECK 2,509,082
HOT-WIRE CLAMP

Filed Dec. 22, 1945 7 Sheets-Sheet 1

Inventor
Henry W. Bodendieck
By: Robert H. Wendt
Atty.

May 23, 1950     H. W. BODENDIECK     2,509,082
HOT-WIRE CLAMP Filed Dec. 22, 1945     7 Sheets-Sheet 2

Inventor.
Henry W. Bodendieck
By: Robert H. Wendt
Atty.

May 23, 1950   H. W. BODENDIECK   2,509,082
HOT-WIRE CLAMP

Filed Dec. 22, 1945   7 Sheets-Sheet 5

Inventor:
Henry W. Bodendieck
By Robert H. Wendt
Atty

May 23, 1950 H. W. BODENDIECK 2,509,082
HOT-WIRE CLAMP

Filed Dec. 22, 1945 7 Sheets-Sheet 6

Inventor.
Henry W. Bodendieck
By: Robert H. Wendt
Atty.

May 23, 1950 H. W. BODENDIECK 2,509,082
HOT-WIRE CLAMP

Filed Dec. 22, 1945 7 Sheets-Sheet 7

Inventor
Henry W. Bodendieck
BY
R. H. Wendt
Attorney.

Patented May 23, 1950

2,509,082

UNITED STATES PATENT OFFICE 2,509,082

HOT-WIRE CLAMP

Henry W. Bodendieck, Taylorville, Ill.

Application December 22, 1945, Serial No. 636,655

7 Claims. (Cl. 173—273)

The present invention relates to hot wire clamps of the type adapted to be used in connecting transformer leads, jumper leads, or any other connections made to a line or from one line to another on lines which may be energized or de-energized.

One of the objects of the invention is the provision of an improved electrical connector of the clamp type which is spring actuated in one direction and which is adapted to be actuated in the other direction by means of a cam, in such manner that it is unnecessary to utilize any threaded parts.

The ordinary spring type clamps of the prior art have been unsatisfactory, and therefore they have been for the most part superseded by connector clamps utilizing threaded members for opening and closing the jaws of a connector upon an electrical wire. These threaded members were necessary to secure sufficient pressure and to maintain the pressure on an electric wire to reduce the contact resistance and carry the current load which is imposed upon such connectors.

Where screw type clamps are used, experience has proven that these clamps are unsatisfactory, particularly where they are used in service out of doors near the coast lines, where the atmosphere contains salt, or in the neighborhood of industrial establishments, where the atmosphere contains acid fumes. Both of these atmospheric conditions result in corrosion within the cut threads, and in a short time this makes the threaded portions inoperable and unfit to perform all of the uses intended for the clamp.

In other locations where vibration is excessive upon the conductor to which the connector is applied, the threaded screw vibrates loose, causing a loose connection and damage to the electrical conductor, which may cause serious delays and breakdown of transmission lines, and the like.

The spring type clamps of the prior art with which I am familiar were not provided with any operating means for opening the jaws of the clamp, and the jaws were forced apart by the camming action of the transmission line conductor as it pushed into the clamp, due to the operator pulling downward on the clamp. In such connectors, if the springs were made of pressure great enough to warrant a firm contact on the line for carrying current and for preventing endwise shift upon the conductor, it then became very difficult and in most cases impossible to apply the clamp to electrical conductors. The stiffer the spring, the harder it was to force the jaws apart by pressing them against the transmission line conductor. Furthermore, it was not desirable to place the strains on the transmission line conductors which were involved in forcing the spring clamps of the prior art open in this manner by pushing them against the line.

One of the objects of the present invention is the provision of an improved type of clamp or connector which permits the operator to install the clamp upon a conductor, either energized or de-energized, safely and easily, and which eliminates any possibility of the clamp loosening on the line through vibration or any possibility of the freezing of the clamp by corrosion of threads caused by atmospheric conditions.

Another object of the invention is the provision of an improved operating means for clamping connectors of the type described which is not subject to any of the disadvantages of threaded operators, and which will open or close the jaws under high resilient pressure without imposing any substantial strains upon the transmission line.

Another object of the invention is the provision of an improved operating means of the class described which can be used in connection with the so-called "Universal" pole, or which can be used with the clamp sticks that are now on the market and which are adapted to actuate or control the common types of eye screw clamps.

Another object of the invention is the provision of an improved clamp of the class described which has a three point pressure contact upon the conductor, and which will accommodate various sizes of wires, the three point contact jaws providing more contact area and better rigidity on the conductor, and avoiding marring of the lines or the possibility of any undue movement either endwise or up or down, thus adding materially to the life of the conductor and to the satisfactory operation of the clamp.

Another object of the invention is the provision of an improved operator and hot wire clamp from which the operator may be removed to serve in the nature of a master key, preventing any one who does not have such an operator or master key from removing the clamp from the line, and thus providing greater safety to the linemen, since a ground applied by him cannot be removed except by those who have this key, without considerable difficulty.

Another object of the invention is the provision of an improved clamp connector from which the operating member may be removed, thus reducing the weight on the line by a substantial amount, and eliminating the necessity for having an operator for every clamp and reducing the expense, since the operating element need not be provided for every clamp.

Another object of the invention is the provision of a plurality of different forms of hot wire clamps of the class described, which are sturdy, simple, capable of economical manufacture, and adapted to be used under the most adverse conditions without possibility of corrosion affecting their operating characteristics or freezing them on the line, or any possibility of their becoming loose inadvertently.

Other objects and advantages of the invention will be apparent from the following description and the accompanying drawings, in which similar characters of reference indicate similar parts throughout the several views.

Referring to the six sheets of drawings accompanying this specification:

Fig. 22 is a view in perspective of the removable actuating member, which may be used for any of a multiplicity of tap clamps, and which is provided with an integral ferrule so that it can be permanently attached to a pole;

Fig. 23 is a view in perspective of the removable actuating member, which may be used for any of a multiplicity of tap clamps, and which is provided with an eye at its lower end for removable engagement with a clamp stick, disconnect stick, or the like.

Figures 1, 2, 3:
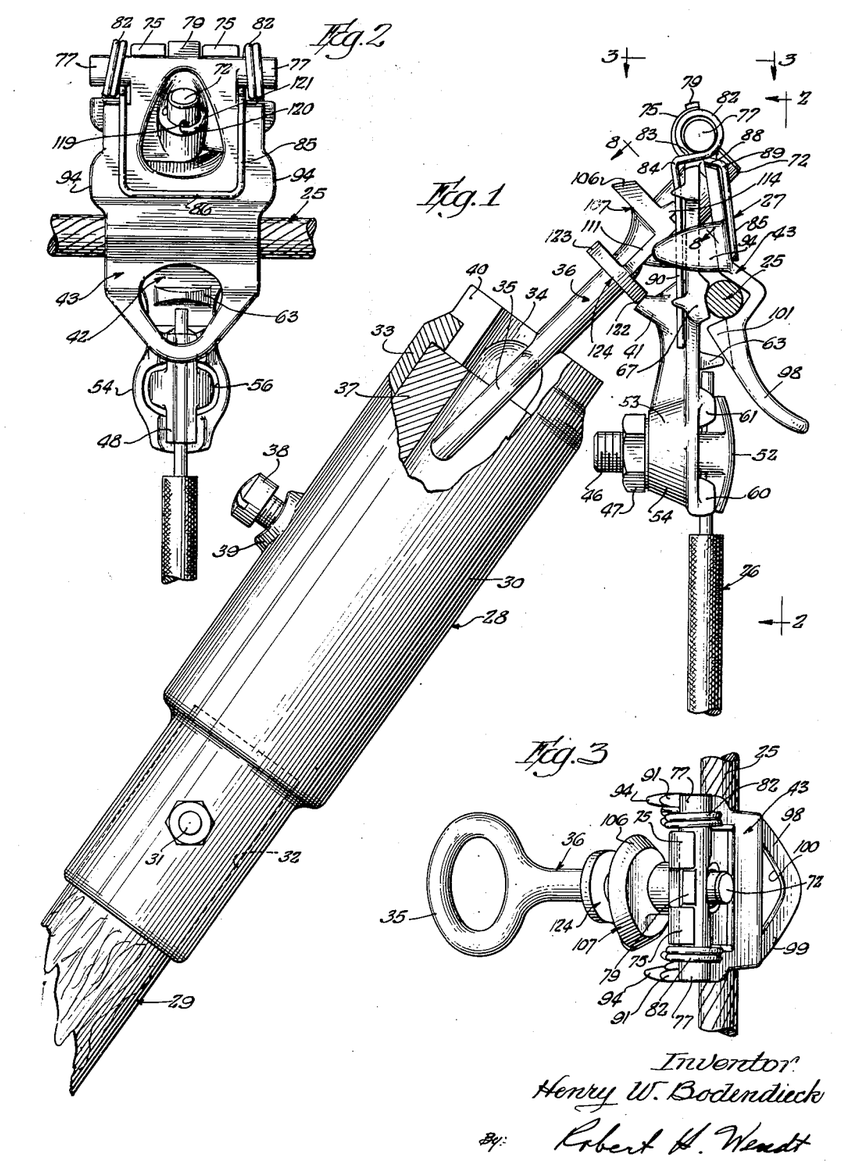
Fig. 1 is a side elevational view in partial section of a clamp embodying my invention, shown in connection with one type of clamp stick that may be utilized for applying the eye screw type of clamp.
Fig. 2 is a rear elevational view of the clamp.
Fig. 3 is a top plan view of the clamp.

Referring to Figs. 1 to 8, these are views showing a form of my invention in which the clamp is illustrated in connection with an actuating member having an eye of the usual size that is employed upon screw type clamps of the prior art. Thus my clamps of this construction will be operable by means of the clamp sticks of the prior art, one example of which is shown in Fig. 1.

In this figure 25 indicates the transmission line conductor energized or de-energized, to which the clamp is to be applied, and 26 the lead or jumper wire or ground. The clamp is indicated in its entirety by the numeral 27, and it is shown in connection with a clamp stick 28 of a type used in the prior art.

Such a clamp stick has a long insulated wooden pole 29, the length of which depends upon the voltages with which it is to be used, and it has a head 30, which may be secured to the wooden pole by means of bolts or rivets 31, the pole being located in a socket 32. The head 30 has an outer tubular sleeve member 33 provided with a slot 34 for passing the eye 35 of the clamp actuating member 36.

Another rotatable sleeve 37 is mounted for rotation in the sleeve 33 and controlled by a stop member 38, which moves in a slot 39 in the sleeve 33. The sleeve 37 likewise has a slot for passing the eye 35, when its slot is in registry with the slot 34; but when the sleeve 37 is rotated through ninety degrees, the slots intersect each other and do not permit the eye 35 to pass out of the head 28, but the slot in the outer sleeve permits the operator to rotate the operating member 36 by means of the pole 29 at various angles, depending upon the clearances provided in the slots in the head 28.

An important feature of all of these clamp sticks lies in the fact that the outer sleeve 33 has a pair of slots 40 in its upper face so that the pole may be pushed upward on a clamp until one or the other of the slots 40 receives a lug 41 on the clamp.

When the clamp and pole are in this position, the pole may be used for bending or twisting the jumper 26 or other lead to bring the clamp into alignment with the conductor 25, to which it is applied.

It will be noted that my clamps preferably all have such a lug 41 for permitting the holding of the clamp fixedly on the end of the clamp stick by pushing the clamp stick up and permitting the eye to move down in the sleeves.

The present clamp illustrated in Figs. 1 to 8 may be constructed out of a minimum number of parts, the operating member 36, the relatively fixed clamping member 42, the relatively movable clamping member 43, the spring 44, and the connector 45 for securing the jumper wire or other lead 26 to the fixed clamping member 42.

This connector 45 is preferably in the form of a threaded member having a threaded shank 46, a nut 47, and a head 48. The head 48 may consist of substantially circular portion 49, which has a through bore 50 for passing the conductor 26, which is located in a partially cylindrical groove 51 on the under side of the elongated head 48.

The elongated head 48 is preferably provided with a convexly curved surface 52, which is curved in both directions, the longitudinal curvature being provided for a specific purpose. For example, when this bolt is in clamping position in connection with the conductor 26, as shown in Fig. 1, the curved head surface 52 on the clamp and bolt serves to guide the conductor into the space between the jaws and minimizes the possibility of the conductor being caught or impeded in its motion to the position between the jaws of the clamp.

The head 48 is preferably elongated, and may be substantially rectangular in plan, as seen in Fig. 2, so that it gives a substantial contact area engaging the conductor 26. The fixed clamping member 42 is shown in perspective in Fig. 7. It may consist of a cast metal member which has a lower depending connector portion 53.

Figures 4, 5, 6, 7, 8, 21:
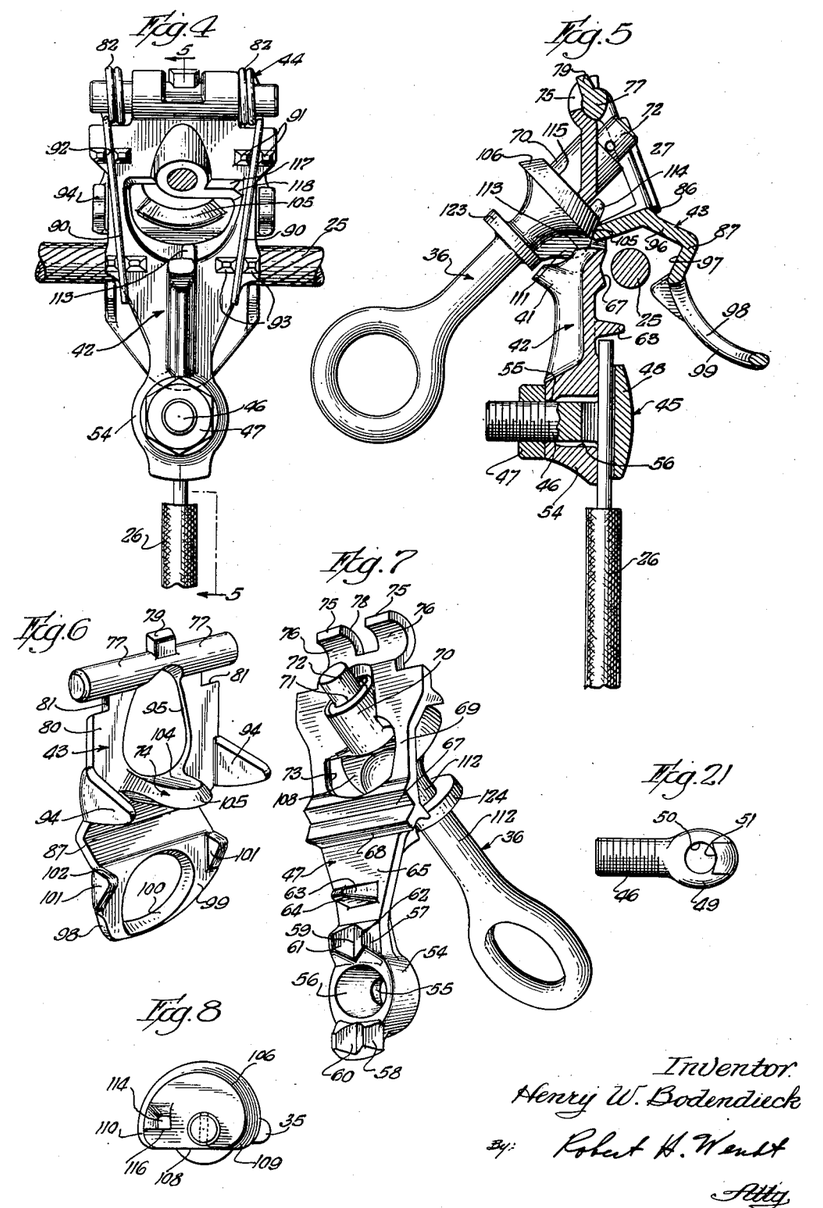
Fig. 4 is a rear elevational view.
Fig. 5 is a sectional view, taken on the plane of the line 5—5 of Fig. 4, looking in the direction of the arrows.
Fig. 6 is a view in perspective of the removable clamping member.
Fig. 7 is a view in perspective of the relatively fixed clamping member and the operating member carried thereby.
Fig. 8 is a top plan view of the operating member or cam.
Fig. 21 is a side elevational view of the connector bolt.

The connector portion 53 has a substantially circular tapered body 54 with a through bore 55 for passing the bolt 45. The through bore 55 communicates with a partially spherical socket 56 for receiving the round portion 49 of the connector bolt 45.

Above and below the socket 56 on the connector body 53 this body is preferably formed with a pair of lugs 57, 58 projecting forwardly away from the operator and provided with V-shaped grooves 59, 60, the walls 61, 62 of which serve to engage conductors of different sizes and to oppose the clamping action of the lower partially cylindrical groove 51 on the lower side of the head of the bolt 45.

The connector portion of this fixed clamping member 47 also preferably has a rearwardly extending stop lug 63, which may be tapered, and which preferably has a flat lower face 64 for engaging the end of the conductor 26 to limit its motion into the connector.

The portion 65 of the fixed clamping head 42 between the connector 53 and the main body may be tapered, increasing in width upwardly so that it has a substantial width at the groove 67 on its inner face for engaging the transmission line conductor 25, thus increasing the contact area. The groove 67 may be V-shaped or partially spherical, and it is preferably formed in a forwardly projecting lug portion 68.

Upwardly from the groove 67 in Fig. 7 the fixed clamping member 47 is provided with a flat body portion 69, substantially rectangular in shape, but provided with a diagonally extending partially cylindrical bearing lug 70, having a diagonal bore 71 for rotatably supporting the upper cylindrical end 72 of the actuating member 36.

The body 69 may be provided with a cut-out portion 73 for decreasing its weight and saving material, and which is also adapted to pass an inwardly projecting cam engaging member 74 carried by the movable clamping member 43.

The upper edge of the plate 69 of the fixed clamping member 42 may be provided with a pair of partially cylindrical hinge bearings 75, the inner cylindrical surfaces 76 of which are adapted to engage the integral cylindrical pintle portions 77 on the movable clamping member 43.

The hinge bearing portions 75 may be spaced from each other by a substantially rectangular slot 78 for receiving a radially projecting lug 79 on the pintle portions 77, that serves as a thrust bearing for determining the longitudinal position of the pintle portions 77 in the bearings 75.

The lug 79 engages the side walls of the slot 78 to prevent axial movement and to keep the parts of the two clamping members in proper alignment with each other. The pintle portions 77 on the movable clamping member 43 (Fig. 6) preferably project beyond the plate-like body 80 of this member at each end, and the plate 80 is provided with a slot 81 between the plate and the pintle 77 on each side to provide space for the coils 82 of the spring 44, which may make a plurality of turns about the ends of the pintle portions. While wire springs of circular cross-section are shown other shapes may be used such as those made from flat stock or sheet spring material.

Various types of springs may be employed, but I prefer to provide a spring of the shape shown, which may be made of spring bronze or some other resilient material having non-corrosion characteristics. As shown in Fig. 1, the spring passes to the left from the coil 82 in a substantially tangential portion 83, which is downwardly turned at substantially right angles at 84, carrying the substantially U-shaped portion 85, which is joined in a similar way to the other coil 82.

The portion 85 of the spring thus has its yoke 86 located to engage the outside of the movable clamping member 43, just above the V-shaped formation 87, which is adapted to engage the conductor 25. This gives the spring an adequate lever arm in its action on a movable clamping member, without interfering with the conductor 25.

The other end of each coil 82 may extend tangentially toward the right in Fig. 1, as indicated at 88, and may be turned downwardly at 89 at substantially right angles; and when tensioned, may be lifted over the intervening parts of the fixed clamping member and may have its straight portion 90 located to engage the rear face of the fixed clamping member, as shown in Fig. 4.

In order to locate and hold these end portions 90 of the spring in proper position, the fixed clamping member 42 may be provided with a pair of lugs 91 spaced from each other to provide a groove 92 at the top (Fig. 4) and another pair of lugs 93, with a similar groove, to receive the spring portion 90 adjacent its lower end adjacent each edge of the clamping member 42 on its rear side.

The lugs 93 are located inwardly and closer toward the similar lugs adjacent the other edge than are the lugs 91 for the reason that it is desired to keep the spring within the borders of the clamping member to keep it in position where it will not interfere with the guide lugs 94 (Fig. 6) on the movable clamping member 43.

Thus the ends of the spring are brought into engagement with the rear side of the fixed clamping member, while the yoke of the spring engages the front side of the movable clamping member; and the spring, being initially tensioned, it tends to cause the two clamping members to close their jaws and to hold a conductor tightly between the jaws.

The assembly of the two parts with the spring is relatively simple, as it is only necessary to place the helical coils 82 on the pintle portions 77, and then to put the two clamping members together with their bearing surfaces 76 engaging the pintle 77, after which the ends 90 may be further tensioned and moved in a clockwise direction, in Fig. 1, until they pass the lugs 94 and settle into the grooves 92 between the lugs 91, 93.

The movable clamping member has already had some of its parts described. Its plate-like body 80 is provided with an oval aperture 95 for passing the shank 72 of the actuating member 36 and for passing the bearing lug 70 of the fixed clamping member.

The two rearwardly projecting lugs 94 may be substantially flat and tapered toward their ends, and they are preferably long enough so that even in the extreme open position shown in Fig. 1 they still overlap the fixed clamping member 42.

They project from the sides of the movable clamping member 43 toward the fixed clamping member, and are located just outside the edges of the fixed clamping member. Their function is to prevent the conductor 25 from getting up into the clamp, where it would be pinched, and to keep the conductor 25 so located that it will be engaged by the proper gripping surfaces of the two clamping members.

Below the lugs 94 the movable clamping member 43 has a V-shaped grooved formation 87 which may consist of a pair of walls 96, 97 at right angles to each other or at any other suitable angle, the inner surfaces of these walls forming a V-shaped groove for engaging the conductor 25. Such a groove will provide a maximum contact engagement with conductors of various sizes.

Below the V-shaped formation 87 the movable clamping member 43 may be provided with a downwardly and outwardly curved camming tongue 98, the inner surface of which, 99, provides a curved guiding surface for aiding in bringing the conductor 25 into a position between the clamping members.

This curved tongue 98 may be provided with an oval aperture 100 for the purpose of reducing weight and for passing the stop lug 63 on the fixed clamping member in the case of a small conductor 25.

It will be noted that the curved surface 52 on the head of the conductor bolt 45 is also constructed so as to permit the conductor 25 to slide over it most easily into the space between the clamping members of the device.

Although the lug 63 projects slightly, it does not materially interfere with the entrance of the conductor 25. Additional means for retaining a conductor between the clamping members may be provided in the form of a pair of triangularly rearwardly extending flanges 101 located on the rear side of the tongue 98 and located on each side of the shank portion 65 of the fixed clamping member.

These triangular flanges 101 have their upper surfaces 102 located immediately below any wire that is in the grooved portion 87, and effectively increase the size of the wire that may be clamped and held without possibility of inadvertent release.

Figures 9, 10, 11, 12:
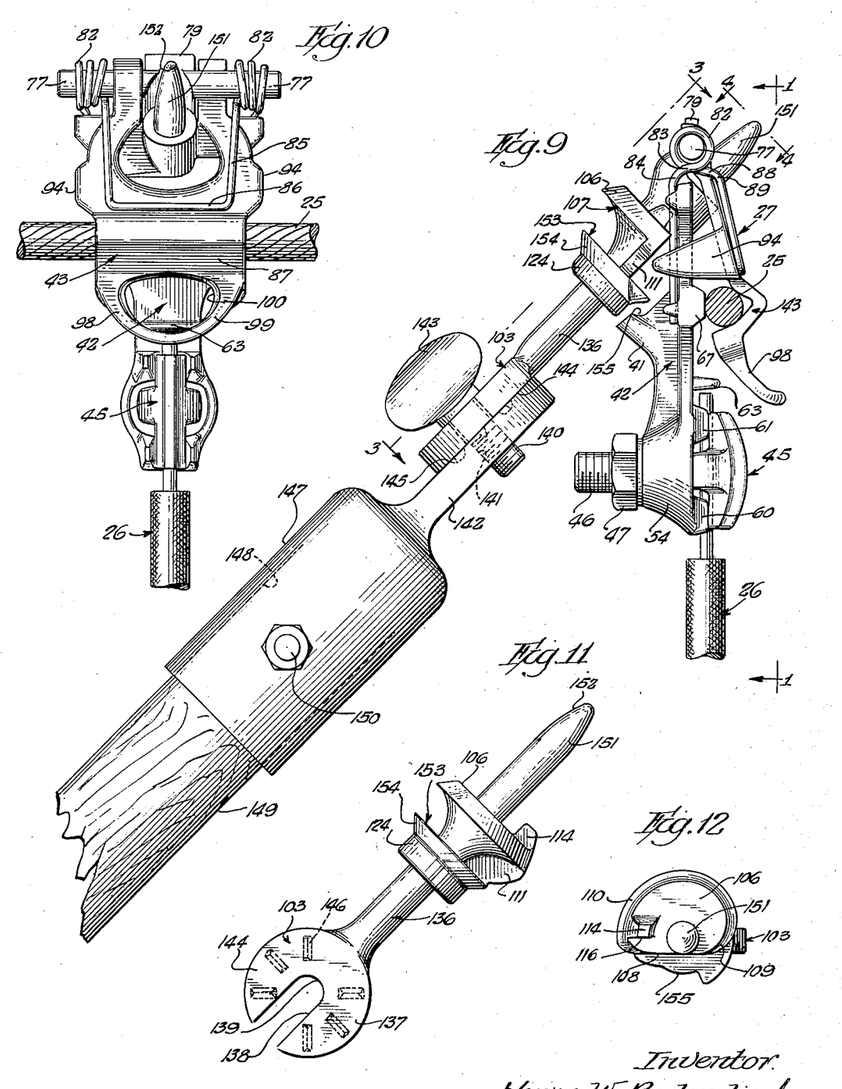
Fig. 9 is a side elevational view of another modified form of clamp, shown in connection with the universal pole.
Fig. 10 is a front elevational view of this clamp.
Fig. 11 is an elevational view of the master key or removable operating element for attachment to a universal pole.
Fig. 12 is a top plan view of the operating element or cam.
Figures 13, 14:
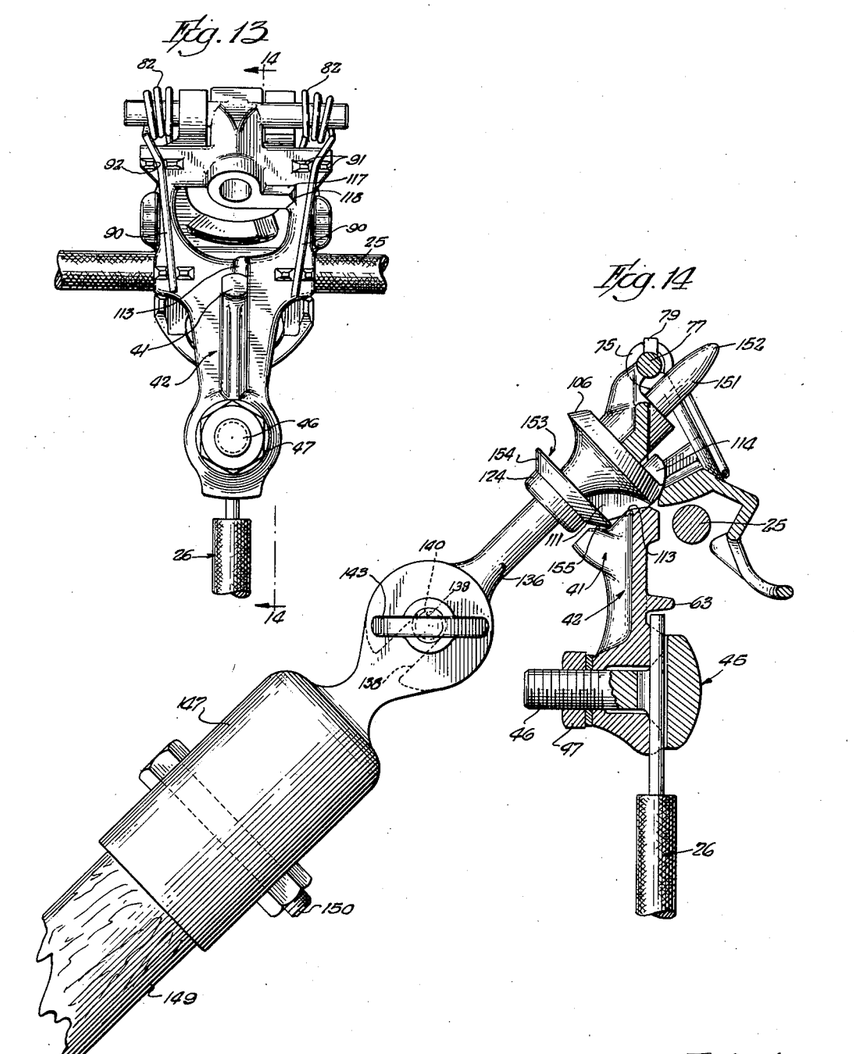
Fig. 13 is a rear elevational view of the clamp of Fig. 10, applied to the wire, but having the operating element removed.
Fig. 14 is a side elevational view in partial section, showing the universal pole in side elevation.
Figures 15, 16, 17:
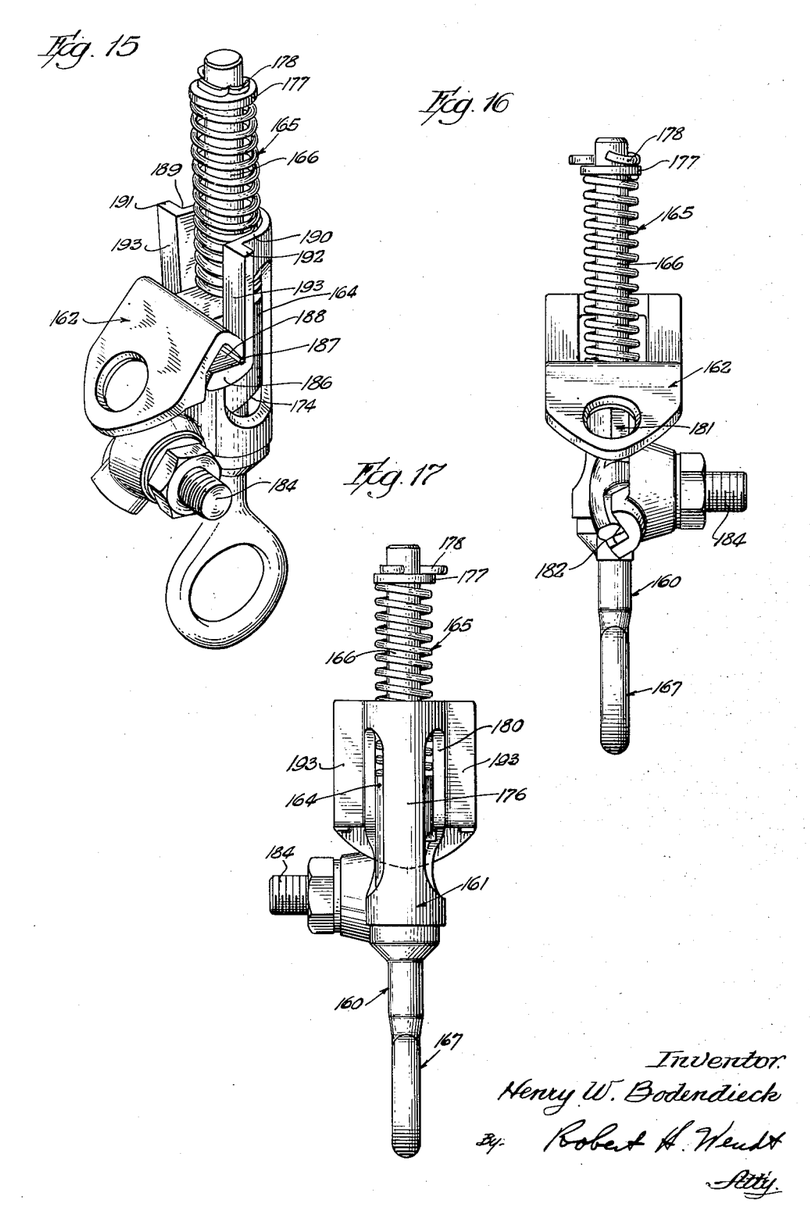
Fig. 15 is a view in perspective of a modified form of clamp.
Fig. 16 is a front elevational view of this clamp.
Fig. 17 is a rear elevational view of this clamp.

The actuating member 36 has been illustrated in Fig. 1 in connection with an eye 35 of the usual size and shape mounted on clamps of the eye screw type. This actuating member 36 may, however, be provided with a head of any desired shape, such as a hexagonal head, square head, or it may have the flanged head 103 of the type adapted to be secured to a universal pole, as shown in Fig. 11.

Figures 22, 23:
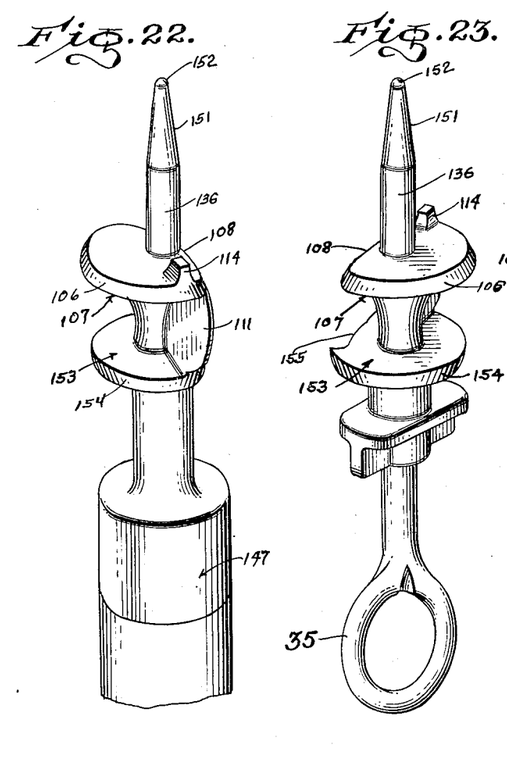

Referring to Fig. 23, this is an illustration of an actuating member of the type described, which is provided with an eye 35 of similar size and shape to the eyes used on the bolts of ordinary tap clamps.

Figure 24:
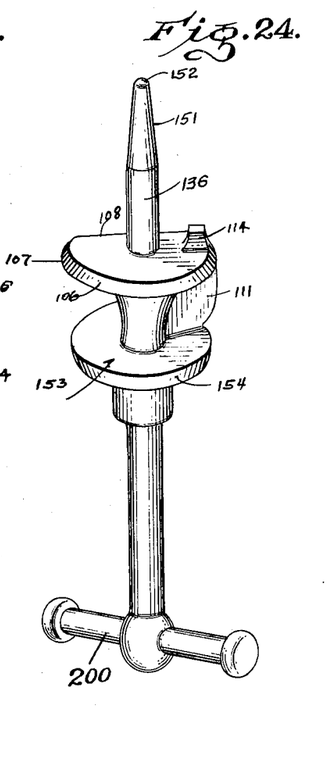
Fig. 24 is a view in perspective of the removable actuating member, which may be used for any of a multiplicity of tap clamps, and which is provided with an integral transverse bar forming a handle for manually turning the cam shaft when de-energized or when energized with low voltages, and using rubber gloves.

Referring to Fig. 24, this is a view in perspective of the same operating member when it is provided with an integral transverse handle 200 adapted to be grasped by the hand, when the clamp is applied to a de-energized conductor or for use on low voltages, when the operator is wearing rubber gloves.

Reference has already been made to the cam-engaging member 74 on the movable clamping member 43. This cam-engaging member comprises a rearwardly projecting partially cylindrical flange 104, having a curved and beveled edge 105, which is of sufficient width to maintain engagement with the curved beveled edge 106 (Fig. 1) on a cam 107, as the movable clamping member 43 pivots outward and the radius of the point of engagement between the cam 107 and cam-engaging member 74 changes.

The actuating member 36 is provided at its upper end with a cylindrical trunnion portion 72 rotatably mounted in the cylindrical bore or bearing 71 of a bearing lug 70 on the fixed clamping member.

Below the cylindrical end portion 72 the shank of the actuating member 36 carries the radially extending cam 107, which may extend over slightly more than 180 degrees, but which also has a flat rear side 108 (Fig. 7) that may be flush with the side of the cylindrical shank 72, permitting it to clear the cam-engaging member 74.

This permits the jaws to close completely to grasp smaller wires and also permits the actuating member to be assembled with the fixed clamping member by sliding the cylindrical end portion 72 into the bearing bore 71 when the flat side 108 of the cam is turned toward the cam-engaging member 74.

Proceeding from the flat side 108 (Fig. 8) the engaging beveled edge 109 of the cam gradually increases in radius to the point 110. In order to provide a stop for maximum movement of the cam, actuating member 36 is also provided with a radial flange 111 extending axially on the shank portion 112 and decreasing in radial width from the maximum width of the cam down to the bearing flange 124.

This flange 111 serves as a stop flange, as it is located to engage the outwardly projecting lug 113 (Fig. 4), which projects upwardly from the bottom aperture 73 in the fixed clamp member. This lug is seen in Fig. 5 in position to engage the stop flange 111, thus preventing the cam from passing off the cam-engaging member 74 at the maximum opening of the jaws.

The cam is also preferably provided with another stop member 114 (Fig. 5), comprising an axially projecting lug extending upwardly from the flat upper surface 115 of the cam and located radially outward of the cylindrical bearing lug 70 so that it will not interfere with the rotation of the actuating member 36 until this member is turned clockwise to the maximum closed position, which is also the position when the flat side 108 is turned toward the cam-engaging member 74.

In this maximum closed position the stop surface 116 (Fig. 8) is located to engage the stop surface 117 on a rearwardly projecting triangular formation 118, serving as a stop member on the rear surface of the fixed clamping member 42 (Fig. 4).

Thus stops are preferably provided for both of the limits of motion of the actuating member. In order to retain the actuating member in assembly with the fixed clamping member the upper end 72 of its shank is preferably provided with a diametrically extending aperture 119 (Fig. 2) for receiving a retaining wire 120, which may pass through this aperture and may be curved to circular form at 121 on each of its ends.

The wire 120 serves as a thrust member for preventing removal of the actuating member; but in some embodiments of the invention, notably that shown in Figs. 9 to 14, this thrust member is omitted.

In order to give the actuating member additional bearing support the outwardly projecting lug 41 that is used for engagement with the clamp stick in twisting the clamp and lead wire (Fig. 1) may be provided with a flat outer end surface 122, serving to engage the cylindrical edge 123 of a disc 124 that is carried by the shank 112.

Engagement of the edge 123 of disc 124 with the end 122 of lug 41 supplements the bearing surface of the bore 71 on the shank 72 in some pushing motions that are exerted on the actuating member 36; but in some embodiments of the invention this feature may be omitted.

The operation of the device just described is as follows:

The jumper or lead 26, which is to be connected to the conductor 25 is first secured in the connector bolt 45. The lug 63 stops the wire 26 in its insertion and determines its final position when the nut 47 is threaded home. The conductor 26 is tightly clamped. If an eye type clamp is used, the eye is placed in the slot 40 of the clamp stick head 28, and the inner sleeve 37 is rotated until the slots cross each other and retain the eye 35.

The pole may then be used to handle the clamp, which is first preferably opened by rotating the actuating member 36 in a counterclockwise direction, which causes the increasing radius of the cam from the point 109 to the point 110 to make the cam engage the surface 105 on the lug 74 of the movable jaw to force the jaws apart against the tension of the spring 44, opening the jaws to the position of Fig. 5.

The slope of the cam is such that the jaws cannot force the cam to rotate, and therefore the cam will hold the jaws in open position.

The device may then be lifted by means of the clamp stick, the insulating handle 29 of which is grasped by the operator; and the weight of the assembly will cause the eye 35 to move downward into the head 28 until the lug 41 is located in the slot 40.

This permits the operator to twist the complete assembly to bring the clamping jaws into alignment with the conductor 25, even though the wire 26 must be twisted, and such lead wires are usually quite heavy.

The clamp may then be hooked over the conductor 25, this conductor being guided by the surface 99 on the movable jaw and the surface 52 on the connector 55 until the conductor is in the position of Fig. 5 between the jaws.

In this position the clamp may be hung on the conductor so that it is practically self-supporting. The clamp stick may be withdrawn slightly until it merely engages the eye 35, when the clamp stick may be turned in a clockwise direction, and the cam will rotate until its portion of smaller radius engages the tongue 74, thus permitting the spring 44 to force the two jaws together into engagement with the conductor.

The conductor naturally finds a position in the V-shaped groove portion 87 and groove 67 of the two clamping members in the position of Fig. 1. Thereafter the clamp stick may be removed in the usual way, and the clamp with its lead left on the conductor 25 until it is desired to remove it.

Referring to Figs. 10 to 14, these are views showing a modification in which the actuating member for the clamp connector is of the type that may be used as a key which may be removed from the clamp when it is located on a conductor, thus preventing one who does not have the key from removing the connector from the line, except with considerable difficulty.

This reduces the number of parts which are required, as only one key need be employed for a multiplicity of clamping connectors, and also increases the safety in so far as the lineman is concerned. No one who does not have a key can remove the ground or other connection that he has applied for his safety while he was working on the line, except with difficulty.

In this embodiment of the invention the actuating member has been designated by the numeral 136. It is preferably provided with a suitable flanged head 103 of the type employed for connection to a universal pole. Such a removable actuating member is shown in Fig. 11.

Such a flanged head consists of a substantially circular disc 137 provided with an axial slot 138 terminating at a cylindrical surface 139, which is concentric with the center of the disc 137 and adapted to receive the shank of a screw bolt 140.

The screw bolt 140 is threaded into the threaded bore 141 of a supporting plate 142 and is preferably provided with a flat head 143 for engagement with the fingers. The opposed faces 144 and 145 of the flange 103 and plate 142 are preferably provided with spaced radial lugs 146 that interengage to assist in preventing rotation of the disc 137 on the flange 142 when clamped by the screw bolt 140 in the axial position, as shown.

The flange 142 of the universal pole fitting is integrally secured to a metal socket member 147, having a cylindrical socket 148 for receiving the end of the insulated wooden pole 149, which is secured in the socket by a screw bolt and nut 150 or by an appropriate rivet.

In other embodiments of the invention the shank actuating member 136 might be secured directly to the socket member 147, constituting a pole and tool for this particular purpose only. Such a removable operating member permanently mounted on a pole is shown in Fig. 22. However, the more convenient construction is that shown in Fig. 9, where the actuating member or key 136 is adapted for use with universal poles of existing construction.

The actuating member 136 differs from that previously described in that the upper end portion 151 is elongated over the end portion 72, previously described, and provided with a tapered bluntly pointed end 152 for more convenient insertion into the aperture 71.

The construction of the fixed and movable clamping members may be substantially identical to that previously described, but the actuating member has additional different features, as follows:

Since there is no transverse wire pin 120 to act as a thrust bearing and take the axial thrust of the cam on the shank of the actuating member 136, provision is made to take this thrust by means of a thrust flange 153, which may be carried by the edge of the disc 124 at its upper corner.

The thrust flange 153 may have a beveled or a frusto-conical thrust surface 154 on its lower side (Fig. 11) extending far enough to engage the thrust surface 155 on the upper side of lug 41 (Fig. 9). The thrust flange 153 does not extend fully around the periphery of the disc 124, but presents a cut-away side at 155 (Fig. 12) adapted to clear the lug 41 when the key is to be withdrawn. Thus the device in this case may have its actuating member 136 withdrawn from the two clamping members after the clamp has been placed upon the conductor 25.

The operation of this embodiment is substantially the same as that previously described except that it is preferable that the actuating member 136 extend in a definite direction and be held substantially rigidly.

The clamp connector is handled in exactly the same way as in the previous embodiment except that, when the operator has finished and has moved the cam in a clockwise direction to the point where the clamp engages the conductor, the operator may then pull on the clamp stick or universal pole until the shank 151 of the actuating member 136 is withdrawn from its bore 71.

This leaves nothing but the two clamping members and the lead to which they are connected on the conductor.

It will be apparent that in this case no one who does not possess a key of the type illustrated in Fig. 11 can remove this clamp from an energized conductor.

If the operator has placed a ground on the conductors on which he is working in this manner, there is a greater degree of safety in view of the fact that no one can remove the ground except by the use of a key of this type, without some difficulty.

It is also necessary to have only one key for many clamps, and thus there is a marked saving in the cost of the clamps because of the elimination of the necessity for this part in all of the clamps.

Referring now to Figs. 15 to 20, these are views showing another modification of the invention. In this case the main parts of the clamp connector are the connecting member 160, the relatively fixed clamping member 161, the relatively movable clamping member 162, the connector 163 for the lead, the cam 164, and the spring 165.

In this case the actuating member may consist of a cylindrical shank 166, which may again be directly attached to a pole or to a universal pole flange, or may be provided with an eye 167, if the connection is not to be temporary.

The shank 166 has a radially extending thrust flange 168 with an annular thrust surface 169, and it is provided with an integral radially extending lug 170, spaced from the thrust surface 169 sufficiently to rotate above the radial flange 171 on the fixed clamping member 161.

The shank 166 carries another radially extending camming lug 172, which may have a diagonal camming surface 173 on its upper side for engaging the camming surface 174 on the cam 164. The length of the lugs 170 and 172 is such that the shank 166 may be rotated inside the bore 175 of the sleeve 176 of the fixed clamping member 161.

The length of the shank 166 is such that it projects above the two clamping members and provides room for carrying the helical coil spring 165 in its compressed position (Fig. 19), when the jaws are open.

Figure 18:
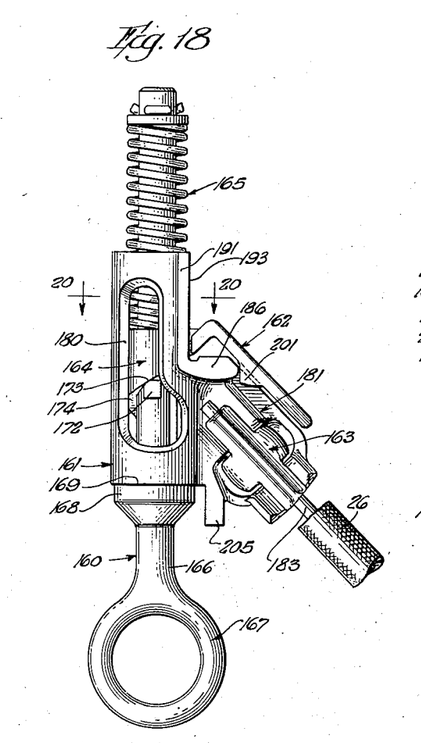
Fig. 18 is a side elevational view of this clamp.

When the jaws are closed, as shown in Fig. 18, the spring 165 is adapted to be received in the bore 175 of the sleeve 176. At its upper end the coil spring 165 engages a thrust washer 177, which is held in place by a cotterpin 178, passing through an aperture in the shank 166.

At its lower end the spring 165 engages the top annular surface 179 of the movable clamping member 162.

The fixed clamping member 161 may consist of a cast metal member in the form of a sleeve 176, having an inner cylindrical bore 175 large enough to receive the spring 165 or the cam 164 and to permit the lugs 170, 172 to rotate therein.

Unnecessary parts of the sleeve may be cut away to reduce weight by forming the apertures 180 in either side of this clamping member. At its right side in Fig. 18 this clamping member has a radially outwardly and downwardly extending integral connecter flange 181, which has a V-shaped groove 182 (Fig. 16) upon its face for receiving the jumper or other lead 183, and may also have a socket and bore for receiving the connector bolt 184 that may be exactly similar to the one previously described.

In this case the conductor 183 is, however, clamped on the side of the flange 181, and the upper edge 185 of this flange is shaped to form a guide for guiding the conductor 25 between the jaws. The sleeve 176 may be open on one side at its upper portion and provided with a forwardly extending shelf 186, which extends at substantially right angles, and which may have a clearance groove at its rear corner 187.

The upper flat surface 188 of this shelf is adapted to engage the conductor 25. The side walls 189, 190 of the sleeve 176 support a pair of outwardly extending guide flanges 191, 192, the forward flat surfaces 193 of which serve to guide the movable clamping member 162 and to prevent its rotation.

Figure 19:
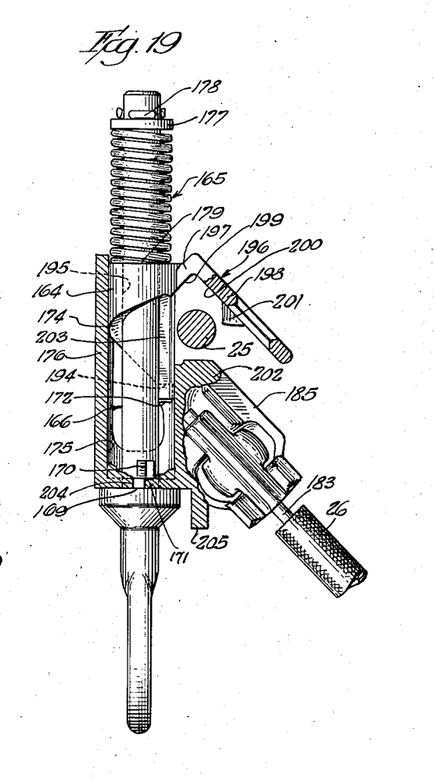
Fig. 19 is a sectional view, taken on the plane of the line 19—19 of Fig. 20.
Figure 20:
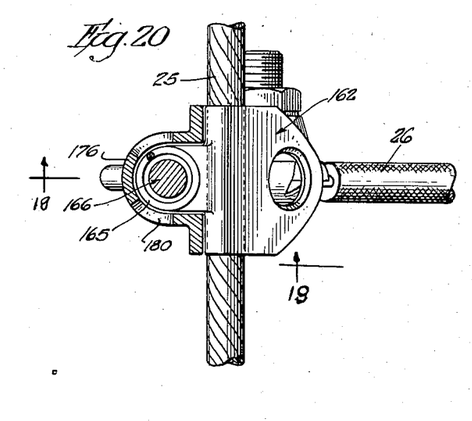
Fig. 20 is a top plan view of this clamp in partial section, taken on the plane of the line 20—20 of Fig. 18.

The movable clamping member is best shown in Fig. 19, and it comprises a metal member which may be cast, and which also has a substantially cylindrical sleeve 164, with a cylindrical through bore 195 for receiving the shank 166.

The size of the cylindrical sleeve 164 is such that it may slide freely in the sleeve 176. At its forward side the sleeve 164 supports an integral jaw member 196, which has a diagonally upwardly extending portion 197 and a diagonally downwardly extending portion 198, the latter being longer, as it is intended to guide the conductor 25 between the jaws.

On its lower side the surfaces 199, 200 define a V-shaped groove for engaging the top of the conductor 25, and the extension of the surface 200 serves to guide the conductor into place. A pair of triangular depending side lugs 201, carried by the surface 200, further aid in confining the conductor 25 between the jaws, these lugs 201 being located to clear the forward edge 202 of the shelf 186 on the fixed clamping member 161.

The sleeve also serves as a cam, and for this purpose its lower edge is provided with the helically curved camming surface 174, terminating at the abrupt axial shoulder 203. At its opposite end the helical camming surface 174 terminates in a transverse shoulder 194, providing a place in which the lug 172 may dwell to hold the jaws in open position.

It should be noted that for purposes of assembly, the inwardly extending radial wall 171 at the bottom of sleeve 176 (Fig. 19) has a slot 204, which is of sufficient width to pass the lug 170 or the camming lug 172.

Thus, when the eye is rotated to proper position, the shank 176 may be inserted from below by passing the lugs 172 and 170 successively through the slot 204. This slot 204 is so located that it will never register with the lug 170 at any position in which camming action is being accomplished, as the lug 170 reacts against the flange 171, when the lug 172 acts against the cam surface 174.

It should be noted that this embodiment is also provided with a depending lug 205 for engaging in the slot of a clamp stick head to permit the operator to twist the complete assembly and to bend the conductor wire 183 until the clamp jaws are in line with the conductor 25.

The operation of this form of the invention is as follows:

The lead 183 is attached in exactly the same manner as in the previous embodiment, and the eye 167 may be secured in the head of a clamp stick. The jaws are opened either before or after being secured to the eye in the clamp stick by turning the eye counterclockwise with respect to the fixed and movable jaws.

During this rotation of the shank of the eye, the lug 172 bears against the camming surface 174 and slides on it, forcing the sleeve 164 axially upward on the shank 166. During this rotation the lug 170 reacts against the lower inwardly extending radial flange 171, but does not come into registry with the slot 204, and the lug 172 finally comes to rest against the flat dwelling surface 194.

As distinguished from the preceding embodiment the cam surface 174 is of such slope that it would force the lug 172 downward, and therefore the flat dwelling surface 194 is necessary to permit the jaws to be held in open position.

The connector clamp is then hooked on the conductor 25, care being taken to use the clamp stick and lug 205 to twist the clamp into alignment with the conductor; and if the operator will turn the eye 167 in a clockwise direction, the lug 172 will ride off the dwelling surface 194 on the camming surface 174, and the spring 165 will force the jaws together into clamping engagement with the conductor 25.

In each case the clamping pressure is placed on the conductor by means of relatively strong springs, and the clamping members have an extended area of contact and a shape which will enable them to grasp conductors of various sizes.

It will thus be observed that I have invented improved cam-operated spring type connector clamps which are provided with springs adapted to maintain sufficient pressure upon the electric wire to carry the current load that is imposed upon the connector, without resort to threaded members or other means for actuating the jaws.

Such a resilient spring pressure on the jaws maintains a good connection under all conditions, including vibration; but the operating mechanism comprising the cam is not affected by corrosion, which might result where the clamp is used near the seashore, where the atmosphere contains salt, or in the neighborhood of industrial establishments, where the atmosphere contains acid fumes.

As distinguished from cut threads, which become inoperable in a short period of time, when any corrosion results, the present clamp has an operating member which is adapted to be used for a long period of time under the most adverse conditions. The spring pressure in this case may be sufficient to provide a firm contact on the line for carrying current and for preventing endwise shift on the conductor, and in fact quite a wide range of spring pressures may be used, since the present cams are adapted to provide sufficient power to open the jaws against heavy springs.

The present connector clamp may be actuated by means of the clamp sticks which are on the market so that these connectors may be used without any new investment in clamp sticks; and in some embodiments of the invention the cam may be made removable so as to prevent any one from removing the clamp except one who has the key in the form of a cam fitting the device.

A three point pressure contact is provided upon the conductor, providing a greater contact area and a better rigidity of the clamp on the conductor, which avoids the marring of the lines and the possibility of any undue movement, either endwise or up and down.

When the actuating member is made removable, this decreases the over-all weight of the clamp, which in many cases is a very desirable feature, since the amount of weight that is placed upon the line should be strickly limited.

The feature of withdrawal and replacement of the cam provides a master key, which results in greater safety to the lineman because he can be sure that no one will remove this clamp who does not have this master key. The use of one master key or cam for a number of clamps also minimizes expense, as it reduces the number of parts by one in most cases.

While I have illustrated a preferred embodiment of my invention, many modifications may be made without daparting from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a tap-off clamp, the combination of a relatively fixed clamping jaw, having a clamping surface for engaging a line conductor, with a movable clamping jaw pivotally mounted on the fixed clamping jaw, and having an opposed clamping surface for engaging a line conductor, one of said jaws being formed with laterally projecting integral pins at the point of pivotal connection between the jaws, a spring having a U-shaped portion engaging one jaw, and having radially extending legs engaging the other jaw, said U-shaped portion and legs being joined by two helically wound portions, and said helically wound portions being mounted on said laterally projecting pins, the legs and U-shaped portion engaging the outsides of the fixed and movable jaws to urge them together into substantially parallel clamping position, the fixed jaw being provided with a bearing extending toward the movable jaw, and the fixed jaw having an aperture below said bearing and a cam follower carried by the movable jaw and projecting into said aperture.

2. In a tap-off clamp, the combination of a relatively fixed clamping jaw, having a clamping surface for engaging a line conductor, with a movable clamping jaw pivotally mounted on the fixed clamping jaw, and having an opposed clamping surface for engaging a line conductor, one of said jaws being formed with laterally projecting integral pins at the point of pivotal connection between the jaws, a spring having a U-shaped portion engaging one jaw, and having radially extending legs engaging the other jaw, said U-shaped portion and legs being joined by two helically wound portions, and said helically wound portions being mounted on said laterally projecting pins, the legs and U-shaped portion engaging the outsides of the fixed and movable jaws to urge them together into substantially parallel clamping position, the fixed jaw being provided with a bearing extending toward the movable jaw, and the fixed jaw having an aperture below said bearing, and a cam follower carried by the movable jaw and projecting into said aperture, and an operating member having a head for manual or operating pole engagement, said operating member having a shaft in said bearing, and having a cam located on the outside of the fixed jaw, and engaging said follower through said hole to cam the movable jaw away from the fixed jaw.

3. In a tap-off clamp, the combination of a relatively fixed clamping jaw, having a clamping surface for engaging a line conductor, with a movable clamping jaw pivotally mounted on the fixed clamping jaw, and having an opposed clamping surface for engaging a line conductor, one of said jaws being formed with laterally projecting integral pins at the point of pivotal connection between the jaws, a spring having a U-shaped portion engaging one jaw, and having radially extending legs engaging the other jaw, said U-shaped portion and legs being joined by two helically wound portions, and said helically wound portions being mounted on said laterally projecting pins, the legs and U-shaped portion engaging the outsides of the fixed and movable jaws to urge them together into substantially parallel clamping position, the fixed jaw being provided with a bearing extending toward the movable jaw, and the fixed jaw having an aperture below said bearing, a cam follower carried by the movable jaw and projecting into said aperture, and an operating member having a head for manual or operating pole engagement, said operating member having a shaft in said bearing, and having a cam located on the outside of the fixed jaw, and engaging said follower through said hole to cam the movable jaw away from the fixed jaw, the said operating member being provided also with a radially extending stop flange, which is cut away at a predetermined point, and said fixed jaw having a lug projecting toward said shaft and located outwardly of the stop flange, for holding the shaft in its bearing, except when the cut away portion of the stop flange is located to pass said lug.

4. In a tap-off clamp, the combination of a relatively fixed jaw member having a clamping surface for engagement with a conductor, a movable jaw member on said fixed jaw, said fixed jaw being provided with a cylindrical bearing member extending transversely to the movable jaw, and an actuating member having a shaft located in said bearing, and having a cam mounted on said shaft for rotation with the shaft, a follower carried by said movable jaw and engaging said cam, and spring means for urging said jaws together into clamping engagement with a conductor located between said opposed clamping surfaces, said actuating member moving said movable jaw to open position against said spring means when the actuating member is rotating in one direction, and permitting the spring means to close said jaw when the actuating member is rotated in the opposite direction, said actuating member having a stop flange carried by said shaft and engaging above a laterally projecting lug on said fixed jaw to retain the actuating member in its bearing, said stop flange being cut away at a predetermined amount, to clear said lug when the actuating member is in a predetermined rotative position, the actuating member being slidable out of said bearing in said latter position, to leave the fixed and movable jaws on a conductor clamped by said jaws.

5. An operating member for clamp connectors comprising an elongated cylindrical shank, said shank being provided with a radially projecting cam member having an edge located at a gradually increasing radius for engaging a follower on a movable clamping member, said shank extending outwardly from said cam, and having a pointed cylindrical portion for insertion into a cylindrical bearing in the fixed clamping member of a tap clamp, said operating member having on its shank, below said cam, a radially extending stop flange for engaging a stop lug on a fixed clamping member, and being provided at its lower end with a head for attachment to an insulating operating pole.

6. In an electrical connector of the tap clamp type, the combination of a relatively fixed and a movable jaw, the said jaws being pivoted one upon the other, the fixed jaw being provided with a depending extension carrying a connector for securement to a tap wire having above said extension a transversely extending groove for engaging a transmission line conductor, the movable jaw also having a cooperating transverse groove for engaging the line conductor, a diagonally downwardly and outwardly extending cylindrical bearing portion carried by said fixed jaw and having a tubular bore extending through it, said fixed jaw also having a through aperture located between said bearing portion and the transversely extending groove, the movable jaw also having an inwardly projecting cam follower above its transverse groove and located to extend through said latter aperture, one of said jaws being provided at its upper end with a transversely extending and laterally projecting integral cylindrical pin, and the other of said jaws being provided with a pair of upwardly projecting, partially cylindrical bearing formations for engaging said pin, said bearing formations being separated by a slot and the integral pin having an integral lug engaged in said slot to prevent lateral movement of the bearing portions on the pin, spring means carried by said pin and having end portions urging said jaws together, and an actuating cam member having a cylindrical shank rotatably mounted in said bearing portion, and having a cam portion carried by said shank engaging said follower, the rotation of said actuating cam in one direction urging the jaws apart against the tension of said spring and rotation in the other direction permitting the jaws to clamp a line conductor through the action of said spring.

7. In an electrical connector of the tap clamp type, the combination of a relatively fixed and a movable jaw, the said jaws being pivoted one upon the other, the fixed jaw being provided with a depending extension carrying a connector for securement to a tap wire having above said extension a transversely extending groove for engaging a transmission line conductor, the movable jaw also having a cooperating transverse groove for engaging the line conductor, a diagonally downwardly and outwardly extending cylindrical bearing portion carried by said fixed jaw and having a tubular bore extending through it, said fixed jaw also having a through aperture located between said bearing portion and the transversely extending groove, the movable jaw also having an inwardly projecting cam follower above its transverse groove and located to extend through said latter aperture, one of said jaws being provided at its upper end with a transversely extending and laterally projecting integral cylindrical pin, and the other of said jaws being provided with a pair of upwardly projecting, partially cylindrical bearing formations for engaging said pin, said bearing formations being separated by a slot and the integral pin having an integral lug engaged in said slot to prevent lateral movement of the bearing portions on the pin, spring means carried by said pin and having end portions urging said jaws together, and an actuating cam member having a cylindrical shank rotatably mounted in said bearing portion, and having a cam portion carried by said shank engaging said follower, the rotation of said actuating cam in one direction urging the jaws apart against the tension of said spring and rotation in the other direction permitting the jaws to clamp a line conductor through the action of said spring, the said fixed jaw being provided on the side toward said actuating cam with a stop lug projecting toward said shank and said actuating cam also carrying below the cam on said shank a radially projecting stop flange engaging above said stop lug and having a cut-away portion for passing said stop lug in one of the positions of said actuating cam.

HENRY W. BODENDIECK.

REFERENCES CITED

The following references are of record in the file of this patent:

UNITED STATES PATENTS

| Number | Name | Date |
|---|---|---|
| 866,105 | Whittlesey | Sept. 17, 1907 |
| 1,194,628 | Hist | Aug. 15, 1916 |
| 1,488,347 | Johnson, Jr. | Mar. 25, 1924 |
| 1,493,517 | Bush | May 13, 1924 |
| 1,515,666 | Elderkin | Nov. 18, 1924 |
| 1,547,314 | Frankel | July 28, 1925 |
| 1,648,326 | Sawyer | Nov. 8, 1927 |
| 1,935,061 | Richards | Nov. 14, 1933 |
| 2,031,921 | Bodendieck | Feb. 25, 1936 |
| 2,114,940 | Rudd | Apr. 19, 1938 |
| 2,194,411 | Tipsord | Mar. 19, 1940 |
| 2,206,653 | Yonkers | July 2, 1940 |
| 2,234,022 | Churchill | Mar 4, 1941 |
| 2,237,588 | De Barbieri | Apr. 8, 1941 |
| 2,329,391 | Cappellanti | Sept. 14, 1943 |

FOREIGN PATENTS

| Number | Country | Date |
|---|---|---|
| 469 | Great Britain | Jan. 13, 1885 |
| 610,842 | Germany | Mar. 16, 1935 |